United States Patent
Anderson

(10) Patent No.: US 8,340,438 B2
(45) Date of Patent: Dec. 25, 2012

(54) AUTOMATED TAGGING FOR LANDMARK IDENTIFICATION

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 420 days.

(21) Appl. No.: 12/640,898

(22) Filed: Dec. 17, 2009

(65) Prior Publication Data

US 2011/0150348 A1    Jun. 23, 2011

(51) Int. Cl.
*G06K 9/46* (2006.01)
*G06K 9/54* (2006.01)
*H04N 7/18* (2006.01)
*H04B 7/00* (2006.01)

(52) U.S. Cl. ... 382/224; 382/190; 382/305; 348/E7.086; 455/41.2

(58) Field of Classification Search ............ 382/173, 382/219, 224, 190, 305; 455/517, 456.1, 455/435.1, 410, 558, 551, 433, 411, 41.2; 701/123, 211, 301; 704/238, 250; 700/248; 326/37, 39, 10, 9; 370/335, 310, 328, 329; 348/E7.086

See application file for complete search history.

(56) References Cited

U.S. PATENT DOCUMENTS

| | | | | |
|---|---|---|---|---|
| 6,119,057 | A * | 9/2000 | Kawagoe | 701/23 |
| 6,711,293 | B1 * | 3/2004 | Lowe | 382/219 |
| 6,987,877 | B2 * | 1/2006 | Paz-Pujalt et al. | 382/152 |
| 7,499,804 | B2 * | 3/2009 | Svendsen et al. | 701/301 |
| 8,139,109 | B2 * | 3/2012 | Schmiedel et al. | 348/118 |
| 2007/0291130 | A1 * | 12/2007 | Broggi et al. | 348/218.1 |
| 2008/0125968 | A1 * | 5/2008 | Bradicich et al. | 701/211 |
| 2008/0194270 | A1 * | 8/2008 | Greenberg | 455/456.1 |
| 2010/0061632 | A1 * | 3/2010 | Young et al. | 382/173 |

OTHER PUBLICATIONS

"The Broken Promise of Automatic Image Tagging/Thoughtlets", pp. 1-8, retrieved Oct. 14, 2009 http://www.sgi.nu/diary/2006/11/16/the-broken-promise-of-automatic-image-tagging/.
Renn et al., "Automatic Image Tagging using Community-Driven online Image Databases", pp. 1-15, retrireved Oct. 14, 2009 http://pubs.iupr.org/DATA/2008-IUPR-18Aug_0756.pdf.
Graham, "Google can sort digital photos on face value", USA Today, Sep. 16, 2009 http://www.usatoday.com/tech/products/2008-09-16-picasa-google_N.htm.
Non-visible infrared/ultraviolet paint. (painting clinic), Oct. 1, 2004, pp. 1-2 retrieved Oct. 14, 2009 http://www.encyclopedia.com/doc/1G1-123329020.html.
Pollefeys et al., "An Automatic Method for Acquiring 3D Models from Photographs: Applications to an Archaeological Site", retrieved Nov. 2009, pp. 1-5 http://www.cs.unc.edu/~marc/pubs/PollefeysPMOMDAI.pdf.
Kushal et al., "Modeling 3D objects from stereo views and recognizing them in photographs", retrieved Nov. 2009, pp. 1-12 http://www-cvr.ai.uiuc.edu/ponce_grp/publication/paper/eccv06a.pdf.

* cited by examiner

*Primary Examiner* — Sheela Chawan
(74) *Attorney, Agent, or Firm* — Yee & Associates, P.C.; Jeremy J. Westlake

(57) ABSTRACT

The different illustrative embodiments provide a method for identifying landmarks in an image. An image of a worksite is received. The image is analyzed to determine a suggested identity of a worksite feature in the image. The suggested identity of the worksite feature is sent over a communications unit. A confirmation of the suggested identity of the worksite feature is received to form a confirmed identity. The confirmed identity and a number of attributes associated with the confirmed identity is stored in a database.

18 Claims, 10 Drawing Sheets

AUTOMATED TAGGING FOR LANDMARK IDENTIFICATION

FIELD OF THE INVENTION

The present invention relates generally to systems and methods for navigation and more particularly to systems and methods for mobile robotic navigation. Still more specifically, the present disclosure relates to automated tagging for landmark identification.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. These robotic devices may have an integrated navigation system for performing a variety of different tasks in semi-autonomous or fully autonomous modes. Mobile robotic devices often rely on visual landmarks and physical perimeters for localization and navigation. Visual landmarks used for localization and navigation in triangulation require persistent landmarks that are identified and localized. These persistent landmarks may be precisely surveyed with global positioning systems or manual measurement methods, which is time-consuming and may be cost-prohibitive. Mobile robotic devices may also be used to survey visual landmarks, but lack the capability to identify and distinguish persistence of a landmark or position stability of the landmark.

SUMMARY

The different illustrative embodiments provide a method for identifying landmarks in an image. An image of a worksite is received. The image is analyzed to determine a suggested identity of a worksite feature in the image. The suggested identity of the worksite feature is sent over a communications unit. A confirmation of the suggested identity of the worksite feature is received to form a confirmed identity. The confirmed identity and a number of attributes associated with the confirmed identity is stored in a database.

The different illustrative embodiments further provide a system for identifying landmarks in an image comprising a worksite features database, a user interface, and a data processing system. The data processing system is configured to execute a data classification process to analyze an image, determine a suggested identity of a worksite feature in the image using the worksite features database, send the suggested identity of the worksite feature over a communications unit, receive a confirmation of the suggested identity of the worksite feature to form a confirmed identity, and store the confirmed identity and a number of attributes associated with the confirmed identity in the worksite features database.

The features, functions, and advantages can be achieved independently in various embodiments of the present invention, or may be combined in yet other embodiments, in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
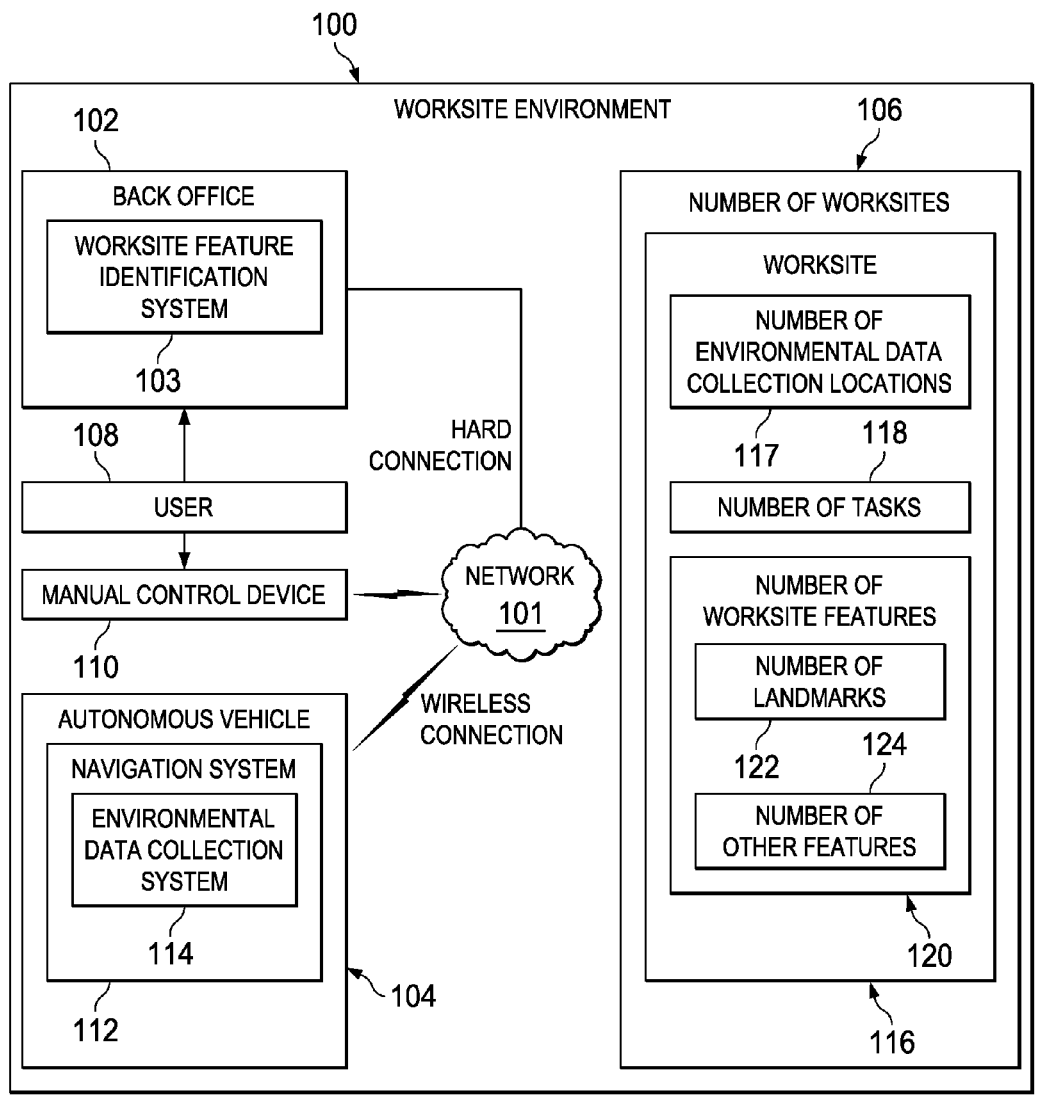
FIG. 1 is a block diagram of a worksite environment in which an illustrative embodiment may be implemented.

With reference to the figures and in particular with reference to FIG. 1, a block diagram of a worksite environment is depicted in which an illustrative embodiment may be implemented. Worksite environment 100 may be any type of worksite environment in which an autonomous vehicle can operate. In an illustrative example, worksite environment 100 may be a structure, building, worksite, area, yard, golf course, indoor environment, outdoor environment, different area, change in the needs of a user, and/or any other suitable worksite environment or combination of worksite environments.

As an illustrative example, a change in the needs of a user may include, without limitation, a user moving from an old location to a new location and operating an autonomous vehicle in the yard of the new location, which is different than the yard of the old location. As another illustrative example, a different area may include, without limitation, operating an autonomous vehicle in both an indoor environment and an outdoor environment, or operating an autonomous vehicle in a front yard and a back yard, for example.

Worksite environment 100 includes network 101 in one embodiment of the present invention. In this example, back office 102 may be a single computer or a distributed computing cloud. Back office 102 supports the physical databases and/or connections to external databases which may be used in the different illustrative embodiments. Back office 102 may supply databases to different vehicles, as well as provide online access to information from databases. Back office 102 may also provide path plans for vehicles, such as autonomous vehicle 104, for example.

Back office 102 includes worksite feature identification system 103. Worksite feature identification system 103 automatically identifies worksite features detected by autonomous vehicle 104 in number of worksites 106.

Worksite environment 100 may include autonomous vehicle 104, number of worksites 106, user 108, and manual control device 110. Autonomous vehicle 104 may be any type of autonomous vehicle including, without limitation, a mobile robotic machine, a service robot, a field robot, a robotic mower, a robotic snow removal machine, a robotic leaf removal machine, a robotic lawn watering machine, a robotic vacuum, and/or any other autonomous vehicle. Autonomous vehicle 104 includes navigation system 112.

Navigation system 112 provides a system for controlling the mobility, positioning, and navigation for autonomous vehicle 104. System capabilities may include base behaviors such as, for example, without limitation, base mobility functions for effectuating random area coverage of a worksite, base obstacle avoidance functions for contact switch obstacle avoidance, base dead reckoning for positioning functions, and/or any other combination of basic functionality for autonomous vehicle 104. Navigation system 112 includes environmental data collection system 114 used for detecting environmental data within a worksite, such as number of worksites 106.

Environmental data detected by environmental data collection system 114 may be sent to worksite feature identification system 103 over network 101 for use in landmark identification and localization. Navigation system 112 may also include path planning capabilities for navigating autonomous vehicle 104 within number of worksites 106 to perform area coverage tasks, for example. Number of worksites 106 may be any area within worksite environment 100 in which autonomous vehicle 104 can operate. Each worksite in number of worksites 106 may be associated with a number of tasks. Worksite 116 is an illustrative example of one worksite in number of worksites 106. For example, in an illustrative embodiment, worksite 116 may be a back yard of a residence of a user. Worksite 116 includes number of environmental data collection locations 117 and number of tasks 118. Number of environmental data collection locations 117 is any location where environmental data collection system 114 may detect environmental data within number of worksites 106, for example. In an illustrative example, number of tasks 118 may include mowing the back yard of the residence of a user. Autonomous vehicle 104 may operate to perform number of tasks 118 within worksite 116. As used herein, number refers to one or more items. In one illustrative example, number of worksites 106 may include, without limitation, a primary yard and a secondary yard. The primary yard may be worksite 116, associated with number of tasks 118. The secondary yard may be associated with another set of tasks, for example.

In one illustrative example, environmental data collection system 114 may be moved to number of environmental data collection locations 117 within worksite 116 by autonomous vehicle 104. In another illustrative example, environmental data collection system 114 may be moved to number of environmental data collection locations 117 by a human, an animal, a human controlled vehicle, and/or any other suitable mobile platform.

Each worksite in number of worksites 106 may include a number of worksite features. Worksite 116 includes number of worksite features 120. Number of worksite features 120 may be any type of visual feature of worksite 116, including, without limitation, landmarks, vegetation, structures, wildlife, buildings, and/or any other suitable visual feature. Number of worksite features 120 may include number of landmarks 122 and number of other features 124.

Number of landmarks 122 may be any type of landmark capable of being detected by autonomous vehicle 104. In an illustrative example, number of landmarks 122 may include, without limitation, cylindrical landmarks, colored landmarks, patterned landmarks, illuminated landmarks, vertical landmarks, natural landmarks, any combination of the foregoing, and/or any other suitable landmark. Patterned landmarks may include a visual pattern incorporated to provide distinctive information, for example. Illuminated landmarks may provide visual detection in low-light or no-light situations, such as night time, for example. Natural landmarks may include, for example, without limitation, tree trunks. Other types of landmarks may include, for example, building architectural features, driveways, sidewalks, curbs, fences, and/or any other suitable landmarks.

Number of other features 124 is any type of visual feature of worksite 116 not suitable as a landmark. Number of other features 124 may include, for example, without limitation, ground cover, flowering plants, and/or any other type of non-persistent object. A non-persistent object may be for example, without limitation, patio furniture.

User 108 may be, without limitation, a human operator, a robotic operator, or some other external system. Manual control device 110 may be any type of manual controller, which allows user 108 to override autonomous behaviors and control autonomous vehicle 104 and/or worksite feature identification system 103. Manual control device 110 may also provide a user interface for user 108 to provide input to worksite feature identification system 103, such as confirmation of automatic identification, for example. In an illustrative example, user 108 may use manual control device 110 to control movement of autonomous vehicle 104 within worksite 116 in order to perform number of tasks 118 and/or identify number of worksite features 120. In another illustrative example, user 108 may use manual control device 110 to confirm automatic identification of number of worksite features 120 by worksite feature identification system 103.

The illustration of worksite environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one illustrative embodiment, worksite feature identification system 103 may be located on autonomous vehicle 104. In this illustrative example, worksite feature identification system 103 may dynamically identify worksite features detected by autonomous vehicle 104 in number of worksites 106.

The different illustrative embodiments recognize and take into account that currently used methods for robotic navigation often use a very primitive, random navigation system. This random navigation system works within a perimeter established by a wire carrying an electrical signal. The robotic machines in currently used methods may be equipped with an electrical signal detector and a bumper switch on the body of the machine. These machines move in a generally straight direction until they either detect the signal from the perimeter wire, or a bumper switch is closed due to contact of the machine with an external object. When either of these two situations occur, these machines change direction. In this way, current methods constrain the machine within a work area perimeter and maintain movement after contact with external objects.

The different illustrative embodiments further recognize and take into account that currently used visual navigation systems for robotic navigation require persistent landmarks to be identified and localized within a worksite. These persistent landmarks may currently be precisely surveyed with global positioning systems or manual measurement methods, which are time-consuming and cost-prohibitive. Further, current mobile robotic devices used to survey visual landmarks lack the capability to identify and distinguish persistence of a landmark or position stability of the landmark.

Thus, one or more of the different illustrative embodiments provide a method for identifying landmarks in an image. An image of a worksite is received. The image is analyzed to determine a suggested identity of a worksite feature in the image. The suggested identity of the worksite feature is sent over a communications unit. A confirmation of the suggested identity of the worksite feature is received to form a confirmed identity. The confirmed identity and a number of attributes associated with the confirmed identity is stored in a database.

The different illustrative embodiments further provide a system for identifying landmarks in an image comprising a worksite features database, a user interface, and a data processing system. The data processing system is configured to execute a data classification process to analyze an image, determine a suggested identity of a worksite feature in the image using the worksite features database, send the suggested identity of the worksite feature over a communications unit, receive a confirmation of the suggested identity of the worksite feature to form a confirmed identity, and store the confirmed identity and a number of attributes associated with the confirmed identity in the worksite features database.

The different illustrative embodiments provide a system for accurate landmark identification and localization through automated landmark detection and tagging.

Figure 2:
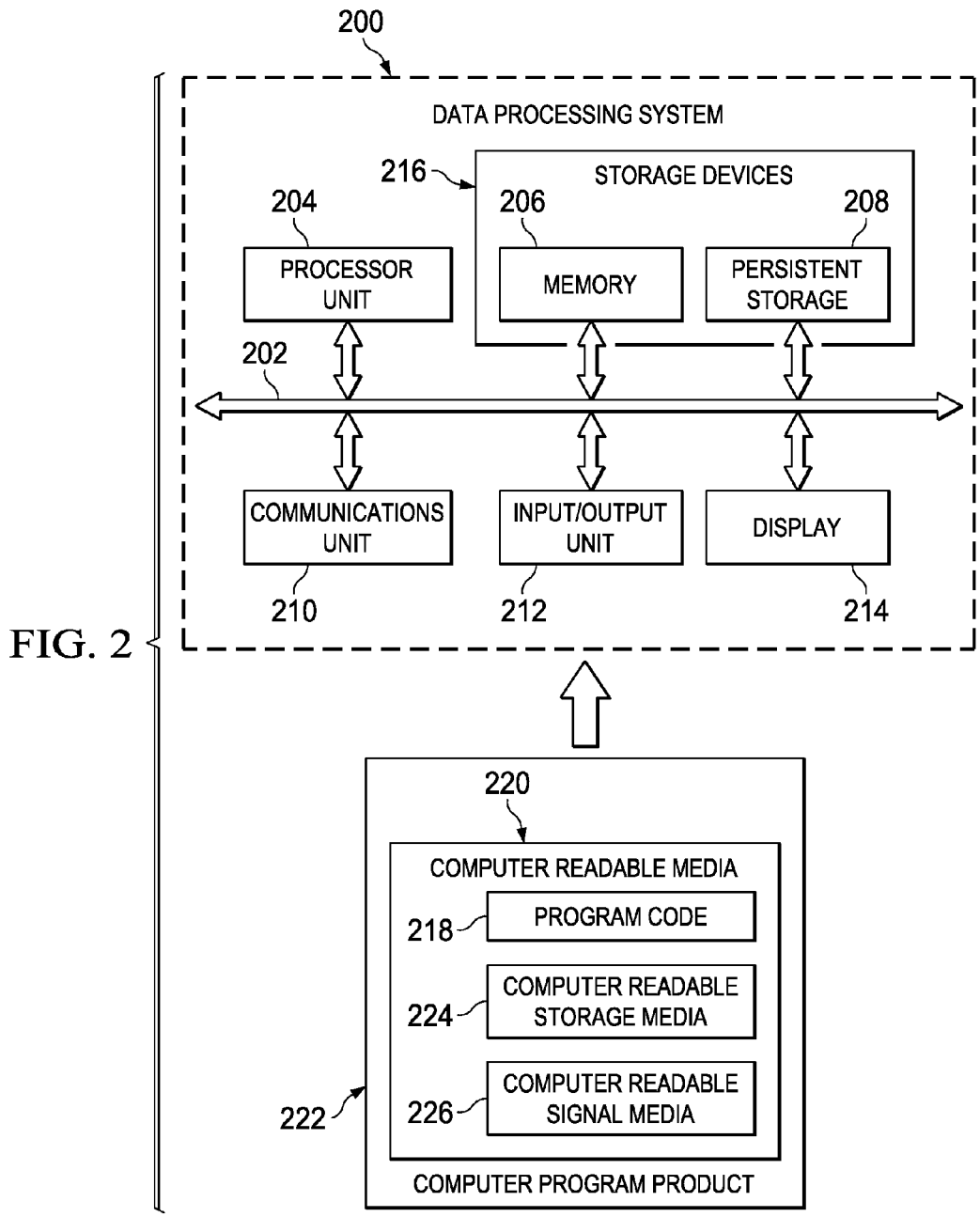
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a computer, such as back office 102 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
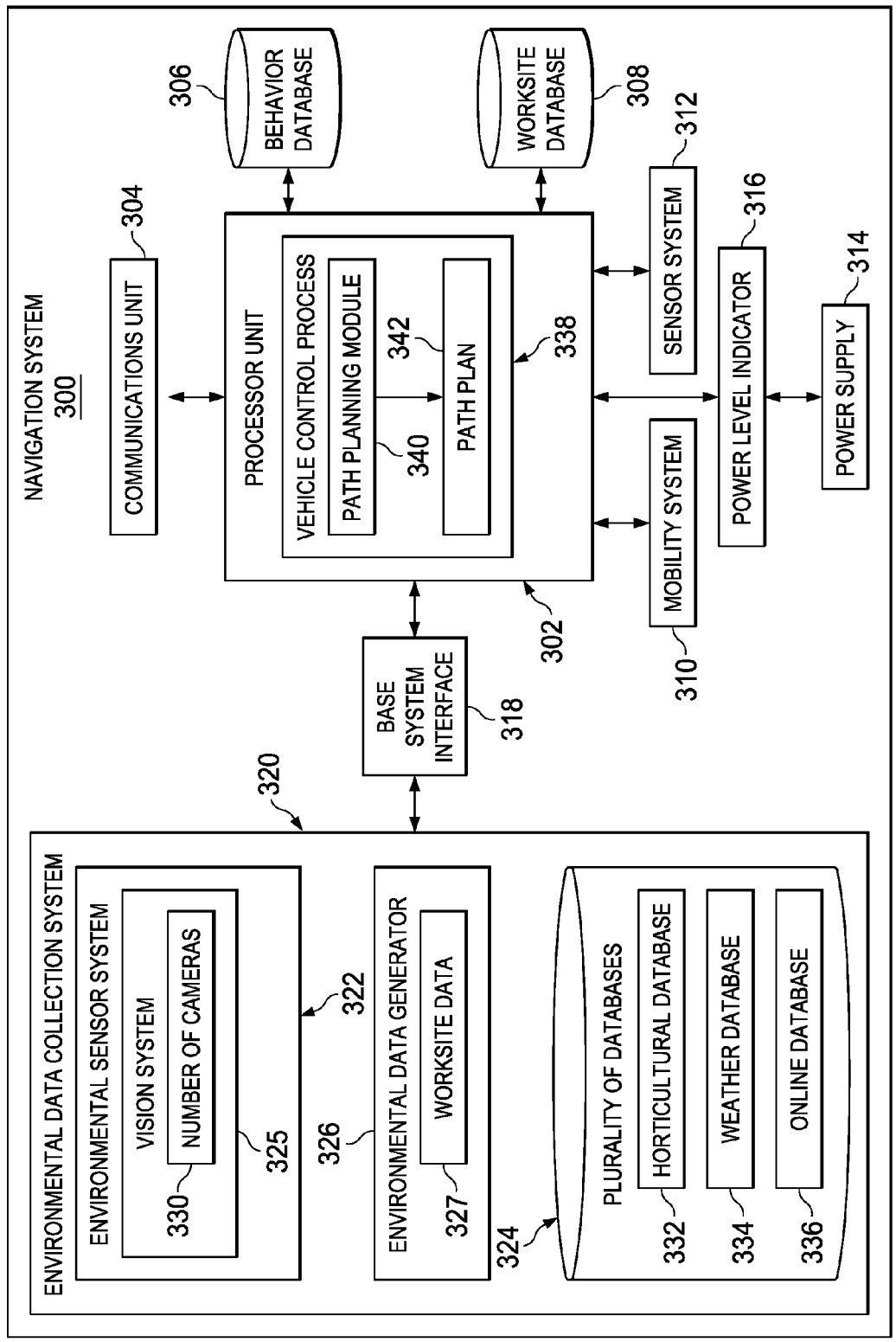
FIG. 3 is a block diagram of a navigation system in accordance with an illustrative embodiment.

FIG. 3 is a block diagram of a navigation system in accordance with an illustrative embodiment. Navigation system 300 is an example of one implementation of navigation system 112 in FIG. 1.

Navigation system 300 includes processor unit 302, communications unit 304, behavior database 306, worksite database 308, mobility system 310, sensor system 312, power supply 314, power level indicator 316, base system interface 318, and environmental data collection system 320. Environmental data collection system 320 includes environmental sensor system 322, plurality of databases 324, and environmental data generator 326.

Environmental sensor system 322 detects worksite features, such as number of worksite features 120 in FIG. 1, and other environmental data in a worksite, such as number of worksites 106 in FIG. 1. Other environmental data may include, for example, without limitation, wind, precipitation, temperature, season, and/or any other suitable environmental data. Environmental sensor system 322 includes vision system 328. Vision system 328 may be, for example, without limitation, a stereo vision system, an asymmetric vision system, a stadiametric ranging vision system, and/or any other suitable vision system. Vision system 328 includes number of cameras 330. Number of cameras 330 may be used to capture images of a worksite or worksite area, such as worksite 116 in FIG. 1, for example. The images captured by number of cameras 330 may be transferred over base system interface 318 to processor unit 302 for use in landmark identification and path planning, for example. As used herein, "number of" refers to one or more images. Number of cameras 330 may include, for example, without limitation, a color camera, a black and white camera, a digital camera, an infrared camera, and/or any other suitable camera.

Plurality of databases 324 of environmental data collection system 320 provide horticultural and weather information associated with a worksite environment, such as worksite environment 100 in FIG. 1. Plurality of databases 324 may include, for example, without limitation, horticultural database 332, weather database 334, on-line database 336, and/or any other suitable database.

Horticultural database 332 may include information such as, without limitation, plant species and varieties, information about the water needs, growth stages, characteristics, and life cycles of the plant species and varieties, specific environmental features of a worksite environment that may affect autonomous vehicles, and the like. For example, characteristics of various plant species may be, without limitation, trunk, bark, branching system, stem size, leaf pattern, budding, non-budding, color, growth pattern, preferred sunlight, preferred soil moisture, preferred soil pH, and the like. Weather database 334 may include current weather for a worksite environment, weather history for a worksite environment, and the like.

Online database 336 may use communications unit 304 to wirelessly access the Internet. Online database 336 dynamically provides information to environmental data collection system 320, which enables adjustment to data generated by environmental data generator 326. For example, online database 336 may include, without limitation, current weather conditions of the worksite environment, current constraints for the worksite environment, weather forecasts for the worksite environment, and/or any other suitable information. Current constraints may include a number of constraints, such as, without limitation, ground conditions undesirable for an autonomous vehicle, such as flooding, for example.

In some examples, online database 336 may be a remotely accessed database. This weather information provided by online database 336 may be used by environmental data collection system 320 to determine which sensors of environmental sensor system 322 to activate in order to acquire accurate environmental data for the worksite environment. Weather, such as rain, snow, fog, and frost may limit the range of certain sensors, and require an adjustment in attributes of other sensors, in order to acquire accurate environmental data from the worksite environment. Other types of information that may be obtained include, without limitation, vegetation information, such as foliage deployment, leaf drop status, and lawn moisture stress.

Environmental data generator 326 uses images captured by number of cameras 330, other environmental data detected by environmental sensor system 322, and information from plurality of databases 324 to generate worksite data 327 about a worksite, such as worksite 116 in FIG. 1. Worksite data 327 may be sent to worksite feature identification system 103 in FIG. 1 for use in automated tagging of worksite features on a worksite map, for example.

Processor unit 302 may be an example of one implementation of data processing system 200 in FIG. 2. Processor unit 302 includes vehicle control process 338. Vehicle control process 338 is configured to communicate with and control mobility system 310. Vehicle control process 338 includes path planning module 340. Path planning module 340 may use information from behavior database 306 and worksite database 308, along with worksite data 327 received from environmental data collection system 320, to generate path plan 342. A path may be any length, for example, one foot or ten feet, and may change as the position of the autonomous vehicle relative to a landmark, obstacle, perimeter, and/or boundary changes.

In one illustrative example, vehicle control process 338 may retrieve a worksite map from worksite database 308 in order to path plan 342 across a worksite, such as worksite 116 in FIG. 1. Vehicle control process 338 may use path plan 342 to send commands and/or signals to mobility system 310 in order to move an autonomous vehicle associated with navigation system 300 according to path plan 342. Vehicle control process 338 may move an autonomous vehicle across path plan 342 in order to survey a worksite and capture images for use in worksite feature identification, for example. Vehicle control process 338 may initiate the worksite survey in response to a trigger, such as, for example, without limitation, a button being selected on an autonomous vehicle, a command from a manual control device, a software-driven event, a time-driven event, and/or any other suitable trigger.

Processor unit 302 may further communicate with and access data stored in behavior database 306 and worksite database 308. Accessing data may include any process for storing, retrieving, and/or acting on data in behavior database 306 and/or worksite database 308. For example, accessing data may include, without limitation, using a lookup table housed in behavior database 306 and/or worksite database 308, running a query process using behavior database 306 and/or worksite database 308, and/or any other suitable process for accessing data stored in a database.

Processor unit 302 receives information from sensor system 312 and may use sensor information in conjunction with behavior data from behavior database 306 when controlling mobility system 310. Processor unit 302 may also receive control signals from an outside controller, such as manual control device 110 operated by user 108 in FIG. 1, for example. These control signals may be received by processor unit 302 using communications unit 304.

Communications unit 304 may provide communications links to processor unit 302 to receive information. This information includes, for example, data, commands, and/or instructions. Communications unit 304 may take various forms. For example, communications unit 304 may include a wireless communications system, such as a cellular phone system, a Wi-Fi wireless system, or some other suitable wireless communications system.

Communications unit 304 may also include a wired connection to an optional manual controller, such as manual control device 110 in FIG. 1, for example. Further, communications unit 304 also may include a communications port, such as, for example, a universal serial bus port, a serial interface, a parallel port interface, a network interface, or some other suitable port to provide a physical communications link. Communications unit 304 may be used to communicate with an external control device or user, for example.

In one illustrative example, processor unit 302 may receive control signals from manual control device 110 operated by user 108 in FIG. 1. These control signals may override autonomous behaviors of vehicle control process 338 and allow user 108 to stop, start, steer, and/or otherwise control the autonomous vehicle associated with navigation system 300.

Behavior database 306 contains a number of behavioral actions which vehicle control process 338 may utilize when controlling mobility system 310. Behavior database 306 may include, without limitation, basic vehicle behaviors, area coverage behaviors, perimeter behaviors, obstacle avoidance behaviors, manual control behaviors, power supply behaviors, and/or any other suitable behaviors for an autonomous vehicle.

Mobility system 310 provides mobility for an autonomous vehicle, such as autonomous vehicle 104 in FIG. 1. Mobility system 310 may take various forms. Mobility system 310 may include, for example, without limitation, a propulsion system, steering system, braking system, and mobility components. In these examples, mobility system 310 may receive commands from vehicle control process 338 and move an associated autonomous vehicle in response to those commands.

Sensor system 312 may include a number of sensor systems for collecting and transmitting sensor data to processor unit 302. For example, sensor system 312 may include, without limitation, a dead reckoning system, an obstacle detection system, a perimeter detection system, and/or some other suitable type of sensor system, as shown in more illustrative detail in FIG. 5. Sensor data is information collected by sensor system 312.

Power supply 314 provides power to components of navigation system 300 and the associated autonomous vehicle, such as autonomous vehicle 104 in FIG. 1, for example. Power supply 314 may include, without limitation, a battery, mobile battery recharger, ultracapacitor, fuel cell, gas powered generator, photo cells, and/or any other suitable power source. Power level indicator 316 monitors the level of power supply 314 and communicates the power supply level to processor unit 302. In an illustrative example, power level indicator 316 may send information about a low level of power in power supply 314. Processor unit 302 may access behavior database 306 to employ a behavioral action in response to the indication of a low power level, in this illustrative example. For example, without limitation, a behavioral action may be to cease operation of a task and seek a recharging station in response to the detection of a low power level.

Base system interface 318 provides power and data communications between environmental data collection system 320 and the other components of navigation system 300. In an illustrative example, images captured by number of cameras 330 may be transferred to processor unit 302 from environmental data collection system 320 using base system interface 318.

The illustration of navigation system 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in an illustrative embodiment, environmental sensor system 322 may be integrated with sensor system 312 of navigation system 300. In another illustrative example, environmental data collection system 320 may be integrated with processor unit 302 of navigation system 300.

In yet another illustrative embodiment, vision system 328 may be a separate component from environmental sensor system 322, and interact with processor unit 302 and/or environmental data collection system 320 using base system interface 318, for example. In yet another illustrative example, plurality of databases 324 may be located remotely from navigation system 300 and accessed by environmental data collection system 320 using communications unit 304.

Figure 4:
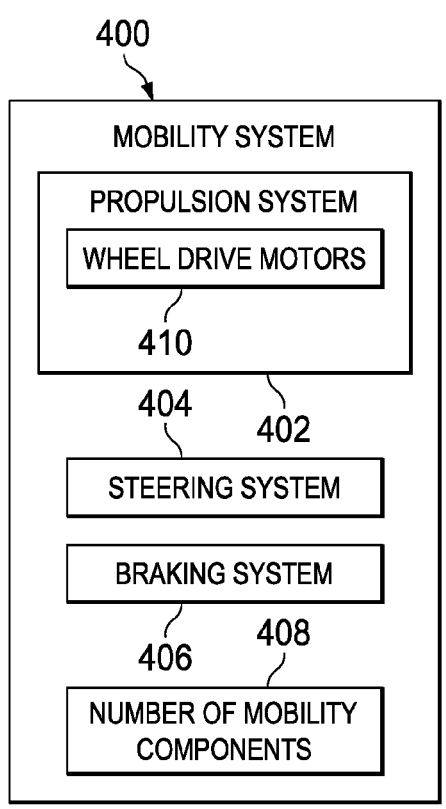
FIG. 4 is a block diagram of a mobility system in accordance with an illustrative embodiment.

FIG. 4 is a block diagram of a mobility system in accordance with an illustrative embodiment. Mobility system 400 is an example of one implementation of mobility system 310 in FIG. 3.

Mobility system 400 provides mobility for autonomous vehicles associated with a navigation system, such as navigation system 300 in FIG. 3. Mobility system 400 may take various forms. Mobility system 400 may include, for example, without limitation, propulsion system 402, steering system 404, braking system 406, and number of mobility components 408. In these examples, propulsion system 402 may propel or move an autonomous vehicle, such as autonomous vehicle 104 in FIG. 1, in response to commands from a navigation system, such as navigation system 300 in FIG. 3.

Propulsion system 402 may maintain or increase the speed at which an autonomous vehicle moves in response to instructions received from a processor unit of a navigation system. Propulsion system 402 may be an electrically controlled propulsion system. Propulsion system 402 may be, for example, without limitation, an internal combustion engine, an internal combustion engine/electric hybrid system, an electric engine, or some other suitable propulsion system. In an illustrative example, propulsion system 402 may include wheel drive motors 410. Wheel drive motors 410 may be an electric motor incorporated into a mobility component, such as a wheel, that drives the mobility component directly. In one illustrative embodiment, steering may be accomplished by differentially controlling wheel drive motors 410.

Steering system 404 controls the direction or steering of an autonomous vehicle in response to commands received from a processor unit of a navigation system. Steering system 404 may be, for example, without limitation, an electrically controlled hydraulic steering system, an electrically driven rack and pinion steering system, a differential steering system, or some other suitable steering system. In an illustrative example, steering system 404 may include a dedicated wheel configured to control number of mobility components 408.

Braking system 406 may slow down and/or stop an autonomous vehicle in response to commands received from a processor unit of a navigation system. Braking system 406 may be an electrically controlled braking system. This braking system may be, for example, without limitation, a hydraulic braking system, a friction braking system, a regenerative braking system using wheel drive motors 410, or some other suitable braking system that may be electrically controlled. In one illustrative embodiment, a navigation system may receive commands from an external controller, such as manual control device 110 in FIG. 1, to activate an emergency stop. The navigation system may send commands to mobility system 400 to control braking system 406 to perform the emergency stop, in this illustrative example.

Number of mobility components 408 provides autonomous vehicles with the capability to move in a number of directions and/or locations in response to instructions received from a processor unit of a navigation system and executed by propulsion system 402, steering system 404, and braking system 406. Number of mobility components 408 may be, for example, without limitation, wheels, tracks, feet, rotors, propellers, wings, and/or other suitable components.

The illustration of mobility system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
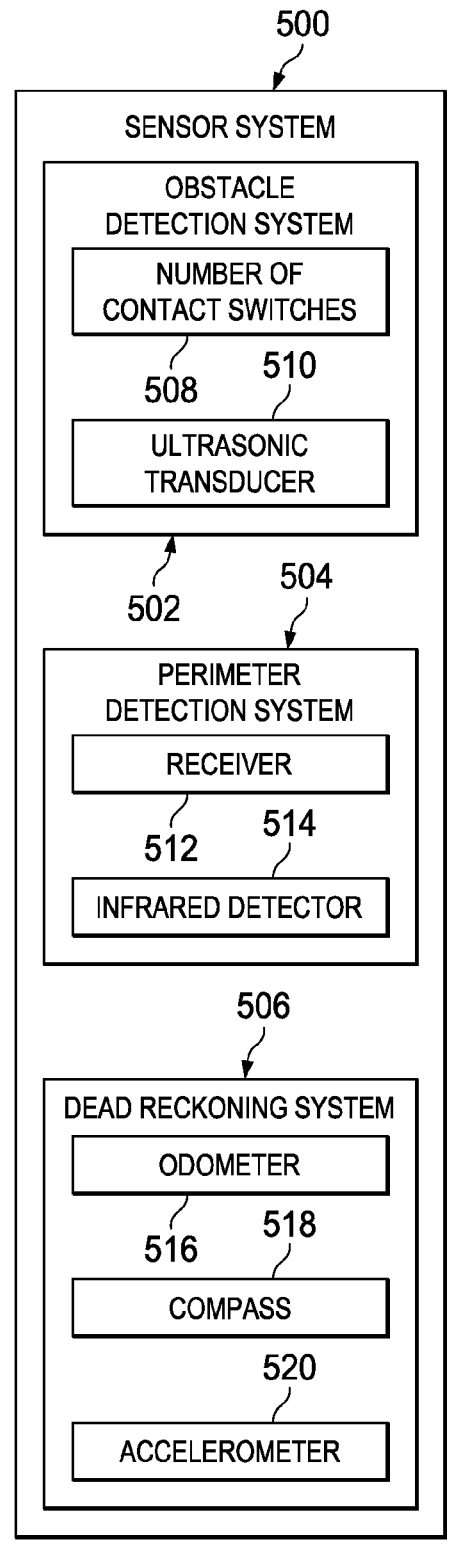
FIG. 5 is a block diagram of a sensor system in accordance with an illustrative embodiment.

FIG. 5 is a block diagram of a sensor system in accordance with an illustrative embodiment. Sensor system 500 is an example of one implementation of sensor system 312 in FIG. 3.

Sensor system 500 includes a number of sensor systems for collecting and transmitting sensor data to a processor unit of a navigation system, such as navigation system 300 in FIG. 3. Sensor system 500 includes obstacle detection system 502, perimeter detection system 504, and dead reckoning system 506.

Obstacle detection system 502 may include, without limitation, number of contact switches 508 and ultrasonic transducer 510. Number of contact switches 508 detects contact by an autonomous vehicle with an external object in the environment, such as worksite environment 100 in FIG. 1, for example. Number of contact switches 508 may include, for example, without limitation, bumper switches. Ultrasonic transducer 510 generates high frequency sound waves and evaluates the echo received back. Ultrasonic transducer 510 calculates the time interval between sending the signal, or high frequency sound waves, and receiving the echo to determine the distance to an object.

Perimeter detection system 504 detects a perimeter or boundary of a worksite, such as worksite 116 in FIG. 1, and sends information about the perimeter detection to a processor unit of a navigation system. Perimeter detection system 504 may include, without limitation, receiver 512 and infrared detector 514. Receiver 512 detects electrical signals, which may be emitted by a wire delineating the perimeter of a worksite, such as worksite 116 in FIG. 1, for example. Infrared detector 514 detects infrared light, which may be emitted by an infrared light source along the perimeter of a worksite, such as worksite 116 in FIG. 1, for example.

In an illustrative example, receiver 512 may detect an electrical signal from a perimeter wire, and send information about that detected signal to a processor unit of a navigation system, such as navigation system 300 in FIG. 3. The navigation system may then send commands to a mobility system, such as mobility system 400 in FIG. 4, to alter the direction or course of an autonomous vehicle associated with the navigation system, in this illustrative example.

Dead reckoning system 506 estimates the current position of an autonomous vehicle associated with the navigation system. Dead reckoning system 506 estimates the current position based on a previously determined position, and information about the known or estimated speed over elapsed time and course. Dead reckoning system 506 may include, without limitation, odometer 516, compass 518, and accelerometer 520. Odometer 516 is an electronic or mechanical device used to indicate distance traveled by a machine, such as autonomous vehicle 104 in FIG. 1. Compass 518 is a device used to determine position or direction relative to the earth's magnetic poles. Accelerometer 520 measures the acceleration it experiences relative to freefall.

The illustration of sensor system 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
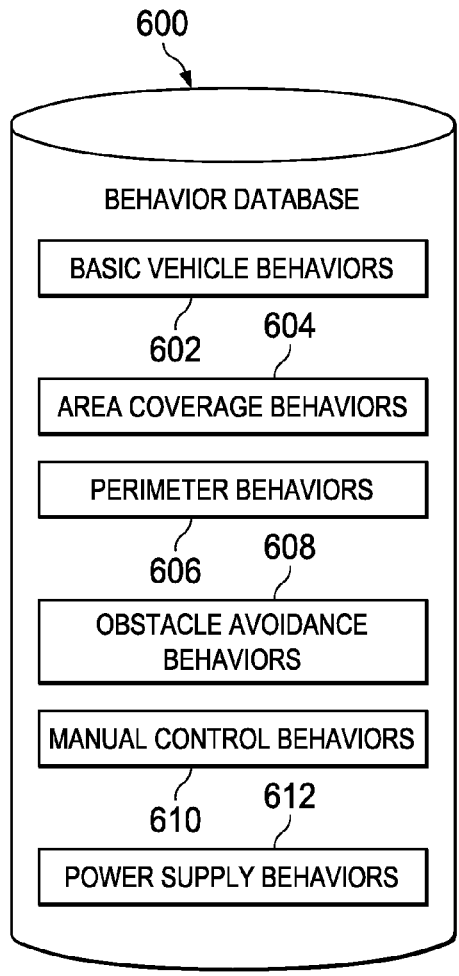
FIG. 6 is a block diagram of a behavior database in accordance with an illustrative embodiment.

FIG. 6 is a block diagram of a behavior database in accordance with an illustrative embodiment. Behavior database 600 is an example of one implementation of behavior database 306 in FIG. 3.

Behavior database 600 includes a number of behavioral actions which vehicle control process 338 of navigation system 300 may utilize when controlling mobility system 310 in FIG. 3. Behavior database 600 may include, without limitation, basic vehicle behaviors 602, area coverage behaviors 604, perimeter behaviors 606, obstacle avoidance behaviors 608, manual control behaviors 610, power supply behaviors 612, and/or any other suitable behaviors for an autonomous vehicle.

Basic vehicle behaviors 602 provide actions for a number of basic tasks an autonomous vehicle may perform. Basic vehicle behaviors 602 may include, without limitation, mowing, vacuuming, floor scrubbing, leaf removal, snow removal, watering, spraying, security, and/or any other suitable task.

Area coverage behaviors 604 provide actions for area coverage when performing basic vehicle behaviors 602. Area coverage behaviors 604 may include, without limitation, sector decomposition behaviors, boustrouphadon area coverage behaviors, spiral area coverage behaviors, customized path plans, and/or any other suitable area coverage behaviors. Sector decomposition behaviors may include, for example, without limitation, follow arc behavior, point-to-point behavior, and/or any other suitable behaviors.

Perimeter behaviors 606 provide actions for a navigation system in response to perimeter detection, such as by perimeter detection system 504 in FIG. 5. In an illustrative example, perimeter behaviors 606 may include, without limitation, follow perimeter, change heading, and/or any other suitable behaviors. Change heading may operate to change the heading for an autonomous vehicle by a number of degrees in order to stay within a perimeter, for example. Follow perimeter may operate to move an autonomous vehicle parallel to a perimeter for a predefined distance, for example. A predefined distance may be, for example, a distance equal to the width of the autonomous vehicle less an error amount.

Obstacle avoidance behaviors 608 provide actions for a navigation system to avoid collision with objects in an environment around an autonomous vehicle. In an illustrative example, obstacle avoidance behaviors 608 may include, without limitation, circle obstacle, reverse direction and change heading, and/or any other suitable behaviors. Circle obstacle may operate to direct an autonomous vehicle around an obstacle to continue along an original path, or around the entirety of an obstacle in order to perform a task on all areas around the obstacle, for example. Reverse direction and change heading may operate to reverse direction and change heading of an autonomous vehicle by a number of degrees before moving forward in order to avoid collision with an object detected by an obstacle detection system, such as obstacle detection system 502 in FIG. 5.

Manual control behaviors 610 provide actions for a navigation system to disable autonomy and take motion control from a user, such as user 108 in FIG. 1, for example. Power supply behaviors 612 provide actions for a navigation system to take a number of actions in response to a detected level of power in a power supply, such as power supply 314 in FIG. 3. In an illustrative example, power supply behaviors 612 may include, without limitation, stopping the task operation of an autonomous vehicle and seeking out additional power or power recharge for the autonomous vehicle.

The illustration of behavior database 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
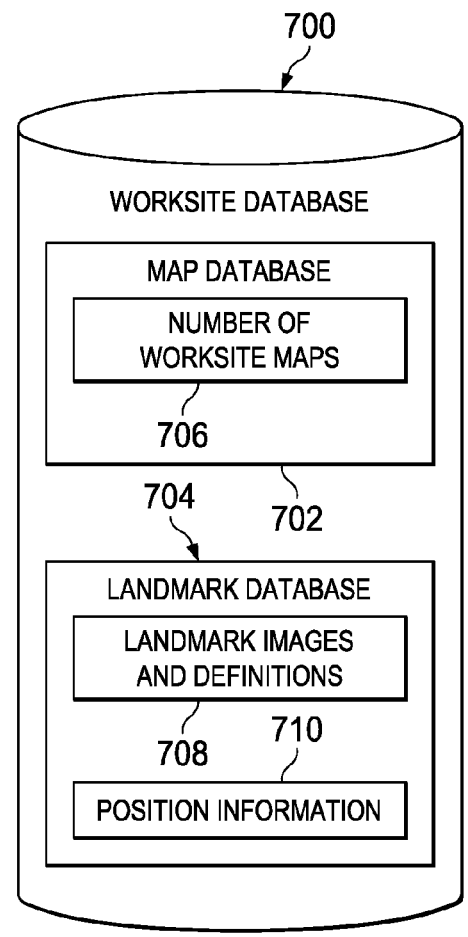
FIG. 7 is a block diagram of a worksite database in accordance with an illustrative embodiment.

FIG. 7 is a block diagram of a worksite database in accordance with an illustrative embodiment. Worksite database 700 is an example of one implementation of worksite database 308 in FIG. 3.

Worksite database 700 includes a number of databases processor unit 302 of navigation system 300 may utilize when planning a path and/or controlling mobility system 310 in FIG. 3. Worksite database 700 may include, without limitation, map database 702, landmark database 704, and/or any other suitable database of information for an autonomous vehicle.

Map database 702 includes number of worksite maps 706. Number of worksite maps 706 may correspond to number of worksites 106 in FIG. 1, for example. In one illustrative embodiment, number of worksite maps 706 may be loaded into map database 702 from a remote location, such as back office 102 in FIG. 1 using network 101. In another illustrative embodiment, number of worksite maps 706 may be stored in map database 702 after being updated by worksite feature identification system 103 in FIG. 1. In yet another illustrative embodiment, number of worksite maps 706 may be loaded into map database 702 by a user, such as user 108 in FIG. 1, over base system interface 318 and/or communications unit 304 in FIG. 3, for example.

Landmark database 704 may include landmark images and definitions 708 and position information 710. Landmark images and definitions 708 may identify a number of landmarks in a worksite, such as number of landmarks 122 in worksite 116 in FIG. 1, for example. Position information 710 identifies the position of each landmark identified in landmark images and definitions 708 relative to locations within the worksite. Position information 710 may be associated with number of worksite maps 706 stored in map database 702, for example.

In an illustrative example, landmark database 704 may be automatically updated by worksite feature identification system 103 using environmental data detected by environmental data collection system 114 in FIG. 1. In another illustrative example, landmark database 704 may be updated by a user, such as user 108 in FIG. 1, after receiving worksite feature data from environmental data collection system 114 in FIG. 1.

The illustration of worksite database 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
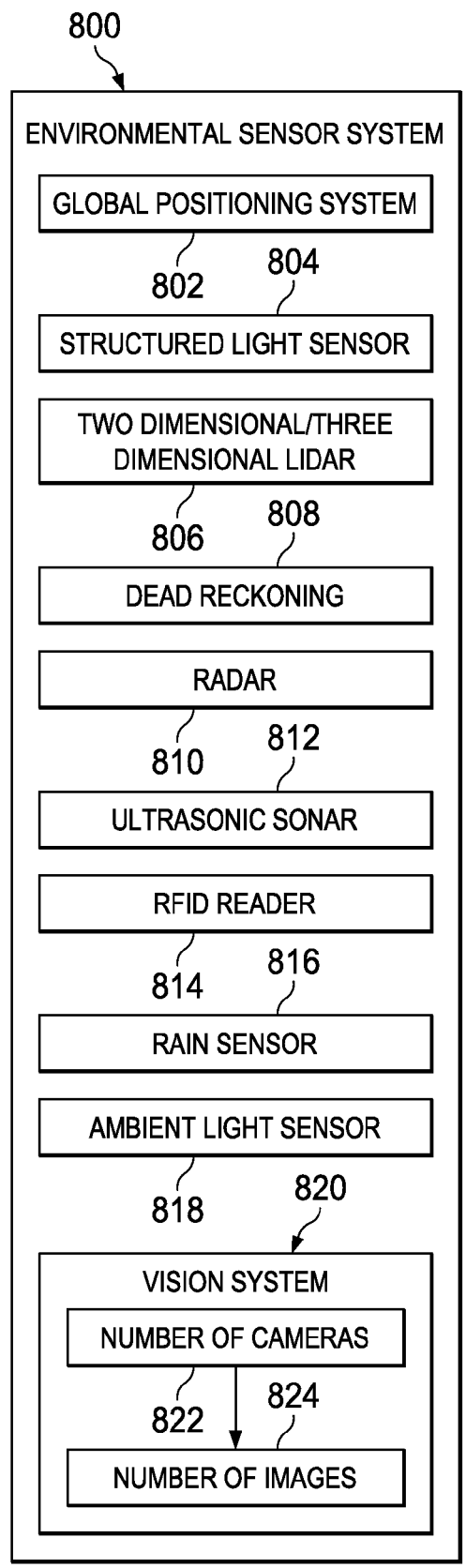
FIG. 8 is a block diagram of an environmental sensor system in accordance with an illustrative embodiment.

With reference now to FIG. 8, a block diagram of an environmental sensor system is depicted in accordance with an illustrative embodiment. Environmental sensor system 800 is an example of one implementation of environmental sensor system 322 of environmental data collection system 320 in FIG. 3.

As illustrated, environmental sensor system 800 may include, for example, without limitation, global positioning system 802, structured light sensor 804, two dimensional/three dimensional lidar 806, dead reckoning 808, radar 810, ultrasonic sonar 812, radio frequency identification reader (RFID) 814, rain sensor 816, ambient light sensor 818, and vision system 820. These different sensors may be used to identify the environment around an autonomous vehicle, such as autonomous vehicle 104 in FIG. 1. For example, these sensors may be used to detect worksite features in the worksite environment around an autonomous vehicle, such as number of worksite features 120 in worksite 116. In another example, these sensors may be used to detect a dynamic condition in the environment. A dynamic condition may be, for example, without limitation, wind speed, wind direction, precipitation, temperature, and/or any other condition in a worksite environment.

Global positioning system 802 may identify the location of the autonomous vehicle with respect to other objects in the worksite environment. Global positioning system 802 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation. Localization information detected by global positioning system 802 may be used to identify position and localization of a landmark within a worksite environment, for example.

Structured light sensor 804 emits light in a pattern, such as one or more lines, reads back the reflections of light through a camera, and interprets the reflections to detect and measure objects in the environment. Two dimensional/three dimensional lidar 806 is an optical remote sensing technology that measures properties of scattered light to find range and/or other information of a distant target. Two dimensional/three dimensional lidar 806 emits laser pulses as a beam, then scans the beam to generate two dimensional or three dimensional range matrices. The range matrices are used to determine distance to an object or surface by measuring the time delay between transmission of a pulse and detection of the reflected signal.

Dead reckoning 808 begins with a known position, which is then advanced, mathematically or directly, based upon known speed, elapsed time, and course. The advancement based upon speed may use the vehicle odometer, or ground speed radar, to determine distance traveled from the known position. Radar 810 is well known in the art, and may be used in a time of flight mode to calculate distance to an object, as well as Doppler mode to calculate the speed of an object. Radar 810 uses electromagnetic waves to identify the range, altitude, direction, or speed of both moving and fixed objects. Ultrasonic sonar 812 uses sound propagation on an ultrasonic frequency to measure the distance to an object by measuring the time from transmission of a pulse to reception and converting the measurement into a range using the known speed of sound. Ultrasonic sonar 812 is well known in the art and can also be used in a time of flight mode or Doppler mode, similar to radar 810. Radio frequency identification reader (RFID) 814 relies on stored data and remotely retrieves the data using devices called radio frequency identification (RFID) tags or transponders. Rain sensor 816 detects precipitation on an exterior surface of the autonomous vehicle. Ambient light sensor 818 measures the amount of ambient light in the worksite environment.

Vision system 820 may be, for example, without limitation, a stereo vision system, an asymmetric vision system, a stadiametric ranging vision system, and/or any other suitable vision system. Vision system 820 includes number of cameras 822. Number of cameras 822 may be any type of camera, including, without limitation, an infrared camera, visible light camera, a color camera, a black and white camera, a digital camera, and/or any other suitable camera. An infrared camera detects heat indicative of a living thing versus an inanimate object. An infrared camera may also form an image using infrared radiation. A visible light camera may be a standard still-image camera, which may be used alone for color information or with a second camera to generate stereoscopic or three-dimensional images. When a visible light camera is used along with a second camera to generate stereoscopic images, the two or more cameras may be set with different exposure settings to provide improved performance over a range of lighting conditions. A visible light camera may also be a video camera that captures and records moving images. Number of cameras 822 capture number of images 824. Number of images 824 may be used by environmental data collection system 320 in FIG. 3 to generate environmental data about a worksite. Number of images 824 may also be used by worksite feature identification system 103 in FIG. 1 to automatically identify worksite features detected in a worksite by environmental sensor system 800.

Environmental sensor system 800 may retrieve environmental data from one or more of the sensors to obtain different perspectives of the environment. For example, environmental sensor system 800 may obtain visual data from vision system 820, data about the distance of the vehicle in relation to objects in the environment from two dimensional/three dimensional lidar 806, and location data of the vehicle in relation to a map from global positioning system 802.

The illustration of environmental sensor system 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
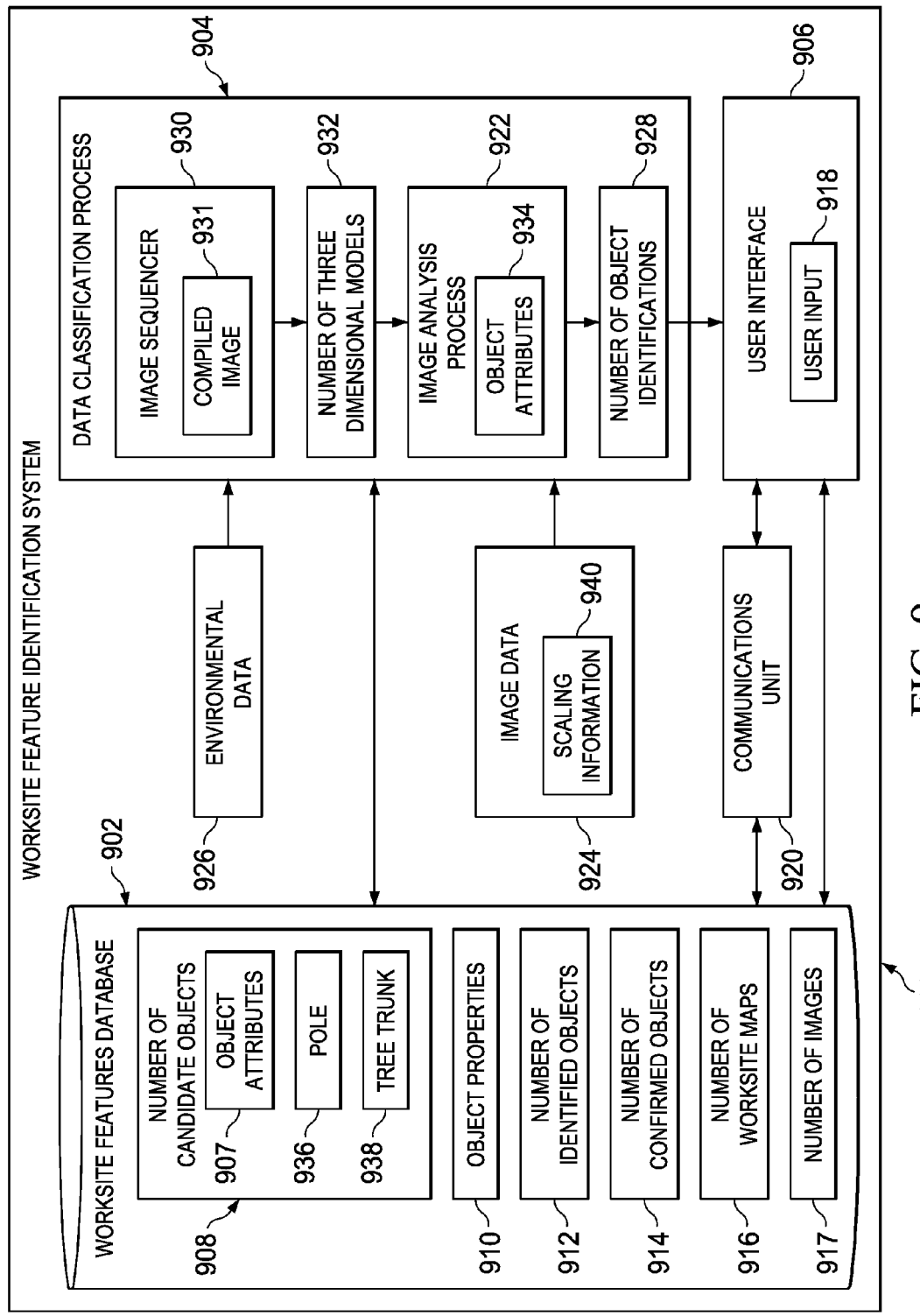
FIG. 9 is a block diagram of a worksite feature identification system in accordance with an illustrative embodiment.

With reference now to FIG. 9, a block diagram of a worksite feature identification system is depicted in accordance with an illustrative embodiment. Worksite feature identification system 900 is an illustrative example of one implementation of worksite feature identification system 103 in FIG. 1.

Worksite feature identification system 900 includes worksite features database 902, data classification process 904, and user interface 906. Worksite features database 902 includes number of candidate objects 908, object properties 910, number of identified objects 912, number of confirmed objects 914, number of worksite maps 916, and number of images 917. Number of candidate objects 908 may be a list of objects which have positional stability and/or are suitable as landmarks for use in localization and navigation, for example. Number of candidate objects 908 may include, for example, without limitation, concrete slab, flower bed, fence, fence post, flag pole, tree trunk, utility pole, outbuilding, house, garden structure, and/or any other suitable object with positional stability.

Number of candidate objects 908 may also include object attributes 907 associated with each of the candidate objects in number of candidate objects 908. Object attributes 907 is information about characteristics of candidate objects, such as, without limitation, color, texture, shape, ratio of dimension, and/or any other suitable characteristic. Each object in number of candidate objects 908 may be associated with one or more attributes in object attributes 907, in this example. Information about color in object attributes 907 may provide a color space to represent points in a RGB color model, such as hue, saturation, and value (HSV) color space or hue, saturation, and lightness (HSL) color space, for example. Information about texture in object attributes 907 may be presented with a numeric value associated with a scale of textures from rough to smooth, for example. Information about shape in object attributes 907 may include references such as, convex, concave, flat, multifaceted, and/or any other suitable shape reference, for example. Information about ratio of height in object attributes 907 may be presented with a numeric value associated with a ratio of height to width, for example.

Object properties 910 includes a list of properties associated with number of candidate objects 908. Object properties 910 may include, for example, without limitation, traversability by an autonomous vehicle, non-traversability by an autonomous vehicle, seasonal change, material components, and/or any other suitable object property. Object properties 910 are attributes of number of candidate objects 908 that have a real world effect on the physical behavior of an autonomous vehicle, such as autonomous vehicle 104 in FIG. 1, for example. In one illustrative example, number of candidate objects 908 may include a concrete slab associated with an object property of traversability by an autonomous vehicle, resulting in a physical behavior of an autonomous vehicle in traversing the concrete slab while performing a number of tasks in a worksite. In another illustrative example, number of candidate objects 908 may include a flower bed associated with an object property of non-traversability by an autonomous vehicle, resulting in a physical behavior of an autonomous vehicle avoiding and/or going around the flower bed while performing a number of tasks in a worksite. In yet another illustrative example, object properties 910 may be associated with operational instructions for an autonomous vehicle. In this example, number of candidate objects 908 may include a tree associated with an object property of non-traversability and operational instructions of "do not bump."

Object properties 910 associated with worksite features identified in a worksite map may also be used by a navigation system, such as navigation system 300, in planning autonomous vehicle behaviors and path plans within a worksite. The real world behavior of an autonomous vehicle is impacted by object properties 910 associated with number of candidate objects 908 identified in a worksite environment.

Number of identified objects 912 may include object properties, description, and/or images associated with an object identification. Number of identified objects 912 represents worksite features automatically identified by data classification process 904. In one illustrative example, number of identified objects 912 may include an image of a cylindrical, narrow, vertical structure, having object attributes of the color brown and texture rough, and object properties of non-traversability. In this example, the object may be identified as "tree trunk" by data classification process 904.

Number of confirmed objects 914 may include object properties, description, and/or images associated with an object identification that has been confirmed by a user, such as user 108 in FIG. 1, for example. In an illustrative example, data classification process 904 may automatically identify an image of a cylindrical, narrow, vertical structure, having object attributes of the color brown and texture rough, and object properties of non-traversability, as "tree trunk." A user may provide user input 918 over user interface 906 to confirm this automatic identification, and data classification process 904 may store the confirmed object identification and properties in number of confirmed objects 914. Number of confirmed objects 914 may also include additional information added by a user via user input 918, such as the diameter or size of an object, for example. This additional information may be used by data classification process 904 to generate a scaled worksite map, for example.

Number of worksite maps 916 are generated by data classification process 904 and stored in worksite features database 902 for use in path planning by a navigation system of an autonomous vehicle, such as navigation system 300 in FIG. 3, for example.

Number of images 917 may be previously generated image data of a worksite, stored images of a worksite, images of a worksite downloaded from a back office or user, and/or any other suitable image. Number of images 917 may be used by image analysis process 922 to analyze image data 924 and identify worksite features, in one illustrative example.

Data classification process 904 includes image analysis process 922. Data classification process 904 may receive image data 924 and/or environmental data 926 from environmental data collection system 320 in FIG. 3. Image data 924 may be a number of images transmitted directly from vision system 328 in FIG. 3, for example. Environmental data 926 may include images and associated environmental data for a worksite environment generated by environmental data generator 326 in FIG. 3, for example.

Image analysis process 922 analyzes image data 924 and/or environmental data 926 and uses worksite features database 902 to generate number of object identifications 928. Image analysis process 922 may also compare image data 924 and/or environmental data 926 to number of images 917 in worksite features database 902 to identify common features between at least two images in number of images 917.

Data classification process 904 includes image sequencer 930. Image sequencer 930 analyzes multiple images of a worksite received from image data 924 and/or environmental data 926 to generate compiled image 931. Compiled image 931 is a three dimensional model of the multiple images of the worksite with point clouds of photographed objects in the images. Image sequencer 930 may use pattern recognition algorithms, which are well known in the art, to compare portions of images to create points. Image sequencer 930 then compares these points to convert the image into a model. Image sequencer 930 extracts number of three dimensional models 932 out of compiled image 931. Number of three dimensional models 932 is a three dimensional model of a number of objects in the images. In one illustrative example, image sequencer 930 may extract a three dimensional model of a central object, such as a tree, from compiled image 931.

Image analysis process 922 identifies object attributes 934 of number of three dimensional models 932. Object attributes 934 are physical characteristics of an object such as, for example, without limitation, color, texture, shape, ratio of dimension, and/or any other suitable characteristic. Image analysis process 922 uses information in number of candidate objects 908, such as object attributes 907 associated with candidate objects, to generate number of object identifications 928. Image analysis process 922 may traverse number of candidate objects 908 and select a candidate object based on the likelihood of match using object attributes 934 identified for the number of three dimensional models 932.

In an illustrative example, if number of three dimensional models 932 has object attributes 934 of narrow, vertical, cylindrical, brown, and rough texture, image analysis process 922 may identify a candidate object in number of candidate objects 908 that has the highest number of shared attributes from the selection of objects in number of candidate objects 908. In this illustrative example, candidate object pole 936 may be associated with object attributes 907 of narrow, vertical, cylindrical, and brown, while candidate object tree trunk 938 may be associated with object attributes 907 of narrow, vertical, cylindrical, brown, and rough texture. In this illustrative example, candidate object tree trunk 938 has a higher number of shared attributes between object attributes 934 and object attributes 907 and is selected by image analysis process 922 as the object identification based on the highest likelihood of a match.

Image data 924 may include scaling information 940 associated with worksite features in an image. In an illustrative example, scaling information 940 may be information about an object in relation to an autonomous vehicle at the time the image was captured by a vision system of the autonomous vehicle, for example. In another illustrative example, scaling information 940 may be information about an object in relation to the position of a camera at the time of capturing the image, where the camera is operated by a human, for example. Scaling information 940 is used to determine the scale, or size, of an object in an image. For example, scaling information 940 may include information on the position of the autonomous vehicle when the image was captured, the vantage point of the number of cameras of a vision system of the autonomous vehicle, the scan angle of a lidar sensor of the autonomous vehicle, the distance of the object from the autonomous vehicle, and/or any other suitable information. In the illustrative example of a tree trunk, the diameter of the tree trunk may be calculated by image analysis process 922 using scaling information 940 to generate geometries, for example.

Data classification process 904 generates number of worksite maps 916 stored in worksite features database 902. Number of worksite maps 916 are tagged worksite maps having a number of identified objects associated with object properties that affect the real world, physical operation of an autonomous vehicle in a worksite. Number of worksite maps 916 is used for localization and path planning by a navigation system, such as navigation system 300, for example.

Data classification process 904 may optionally send number of object identifications 928 to a user over user interface 906 for confirmation of the automated identification of worksite features in an image or environmental data, for example. The user may confirm the automated identification and/or identify additional properties or operational instructions. Confirmed identifications may be stored in number of confirmed objects 914, for example.

The illustration of worksite feature identification system 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
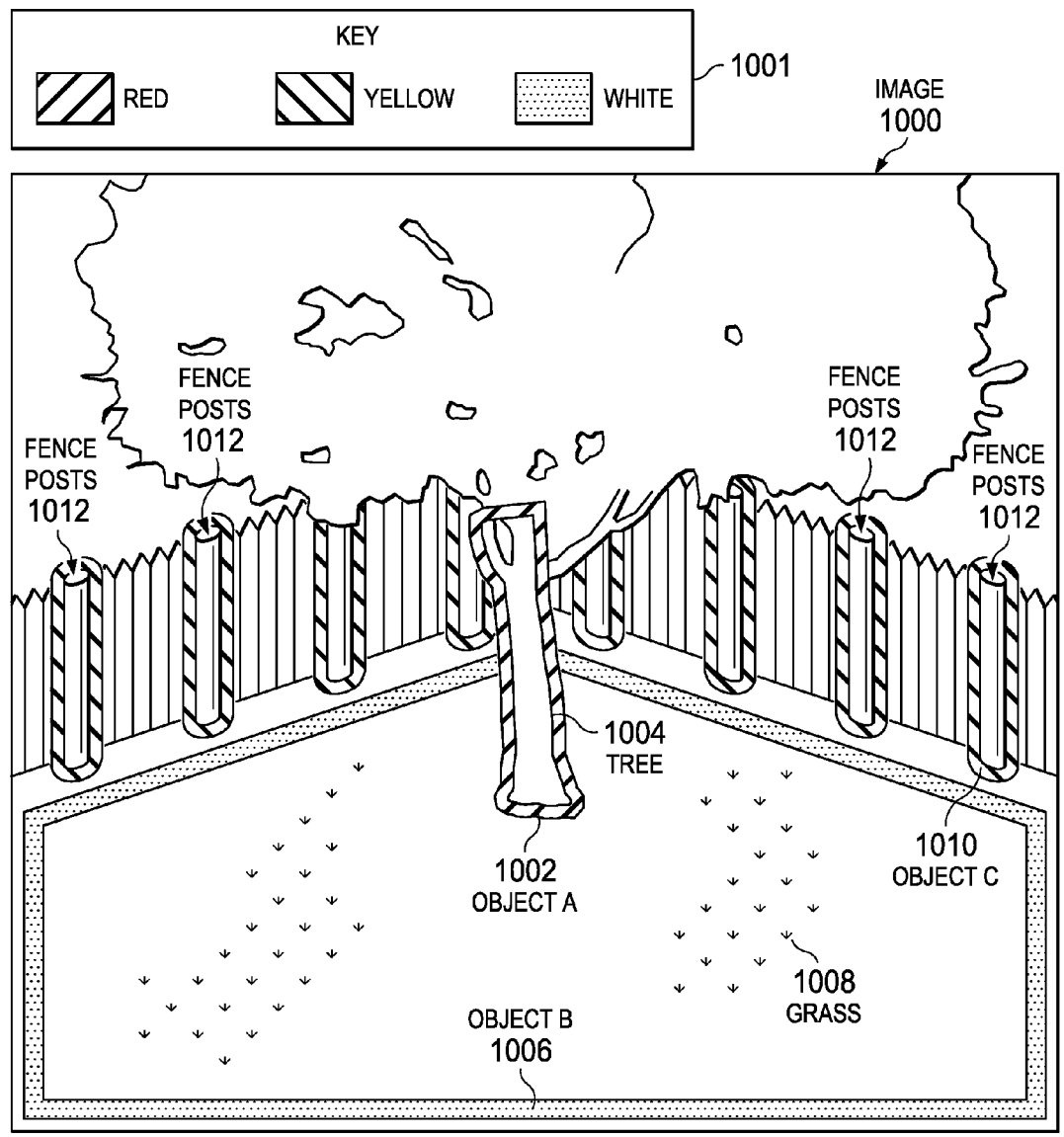
FIG. 10 is a block diagram of an image in accordance with an illustrative embodiment.

With reference now to FIG. 10, a block diagram of an image is depicted in accordance with an illustrative embodiment. Image 1000 is an illustrative example of one implementation of number of images 824 in FIG. 8 and/or compiled image 931 in FIG. 9.

In one illustrative example, image 1000 may be compiled by an image sequencer, such as image sequencer 930 in FIG. 9, using a number of images captured by a vision system, such as vision system 328 in FIG. 3, for example. Image sequencer 930 may extract three dimensional models from image 1000, such as number of three dimensional models 932 in FIG. 9. In this illustrative example, a central object of image 1000 is object A 1002. Object A 1002 may be extracted by image sequencer 930 and outlined in red on image 1000 when displayed using user interface 906 in FIG. 9 for confirmation. Image analysis process 922 identifies object attributes for object A 1002. In this example, the object attributes for object A 1002 may be narrow, vertical, cylindrical, brown, and rough texture. Key 1001 provides identification of colors used to outline extracted three-dimensional features.

Image analysis process 922 identifies, or tags, object A 1002 as tree 1004 in image 1000. The identification may be determined using a worksite features database, such as worksite features database 902 in FIG. 9. For example, image analysis process 922 may traverse number of candidate objects 908 to identify the nearest match of characteristics between the candidate objects and object A 1002. When object A 1002 is identified as tree 1004, object properties associated with a tree are then associated with object A 1002. Image analysis process 922 may identify associated properties in number of object properties 910 or worksite features database 902, for example. Object properties associated with a tree may be, for example, non-traversability or operational instructions of "do not bump."

Image sequencer 930 may extract object B 1006 in image 1000 and outline object B 1006 in yellow when displayed using user interface 906 in FIG. 9 for confirmation, for example. Image analysis process 922 identifies, or tags, object B 1006 as grass 1008 using worksite features database 902 in FIG. 9. Grass 1008 may be associated with object properties such as traversability, for example. In this illustrative example, object B 1006 tagged as grass 1008 and associated with the property of traversability affects the physical operation of an autonomous vehicle in the worksite by providing for the autonomous vehicle to traverse grass 1008 when executing tasks within the worksite, for example.

Image sequencer 930 may extract object C 1010 in image 1000 and outline object C 1010 in white when displayed using user interface 906 in FIG. 9 for confirmation. Image sequencer 930 may also identify a number of other objects with similar three dimensional characteristics in image 1000 and outline the number of other objects in white. Image analysis process 922 may identify object C 1010 as a fence post, and propagate that identification to the number of other objects extracted with the same characteristics, tagging fence posts 1012, for example.

The illustration of image 1000 in FIG. 10 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
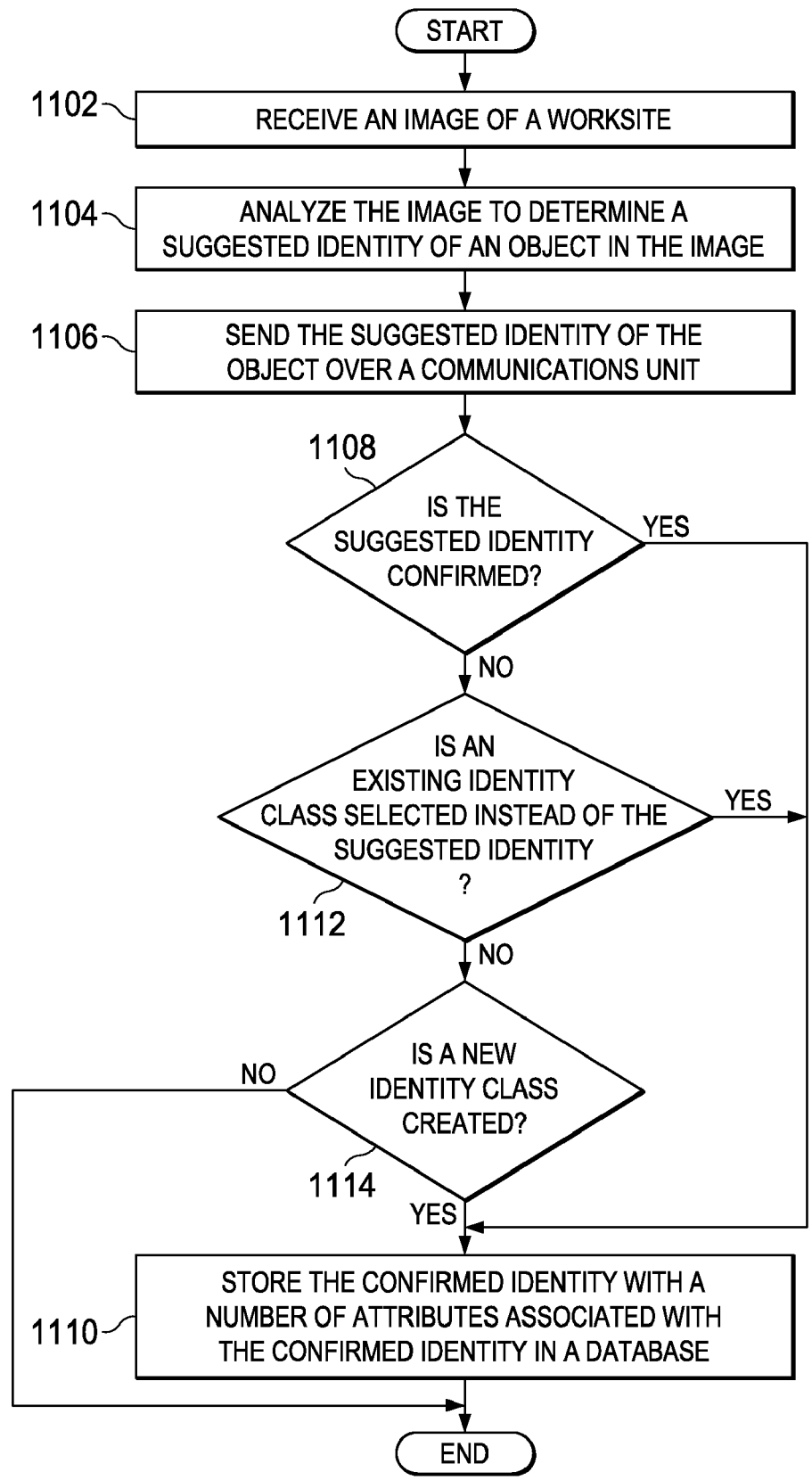
FIG. 11 is a flowchart illustrating a process for identifying landmarks in an image in accordance with an illustrative embodiment.

With reference now to FIG. 11, a flowchart illustrating a process for identifying landmarks in an image is depicted in accordance with an illustrative embodiment. The process in FIG. 11 may be implemented by a component such as worksite feature identification system 103 in FIG. 1, for example.

The process begins by receiving an image of a worksite (step 1102). The image may be captured by an environmental data collection system, such as environmental data collection system 114 in FIG. 1, for example. The image may include a number of worksite features, such as landmarks, objects, and other features present in a worksite.

The process analyzes the image to determine a suggested identity of an object in the image (step 1104). The process may analyze the image using an image analysis process of a data classification process, such as data classification process 904 in FIG. 9, for example. The process then sends the suggested identity of the object over a communications unit (step 1106). The suggested identity may be sent to a user via a user interface, such as user interface 906 in FIG. 9, for example. A user may receive the suggested identity and confirm or change the suggested identity through user input 918 in FIG. 9, for example.

The process next determines whether the suggested identity is confirmed (step 1108). If a determination is made that the suggested identity is confirmed, the process stores the confirmed identity with a number of attributes associated with the confirmed identity in a database (step 1110), with the process terminating thereafter.

If a determination is made that the suggested identity is not confirmed, the process then determines whether an existing identity class is selected instead of the suggested identity (step 1112). An existing identity class may be any object identification stored and/or previously created within a worksite feature identification system, such as worksite feature identification system 900 in FIG. 9. An identity class may refer to any object identification, such as number of candidate objects 908 in FIG. 9, for example.

If a determination is made that an existing identity class is selected, the process proceeds to step 1110, with the process terminating thereafter. If a determination is made that an existing identity class is not selected, the process then determines whether a new identity class is created (step 1114). A new identity class may be any object identification not currently stored and/or recognized within a worksite feature identification system, such as worksite feature identification system 900 in FIG. 9. The new identity class may be created and/or stored in a database, such as number of candidate objects 908 in FIG. 9, for example.

If a determination is made that a new identity class is not created, the process terminates. If a determination is made that a new identity class is created, the process proceeds to step 1110, with the process terminating thereafter.

The process may store the confirmed identity in a database, such as number of confirmed objects 914 in FIG. 9, for example. The confirmed identity may be used to identify a landmark of a worksite in a worksite map, for example.

Figure 12:
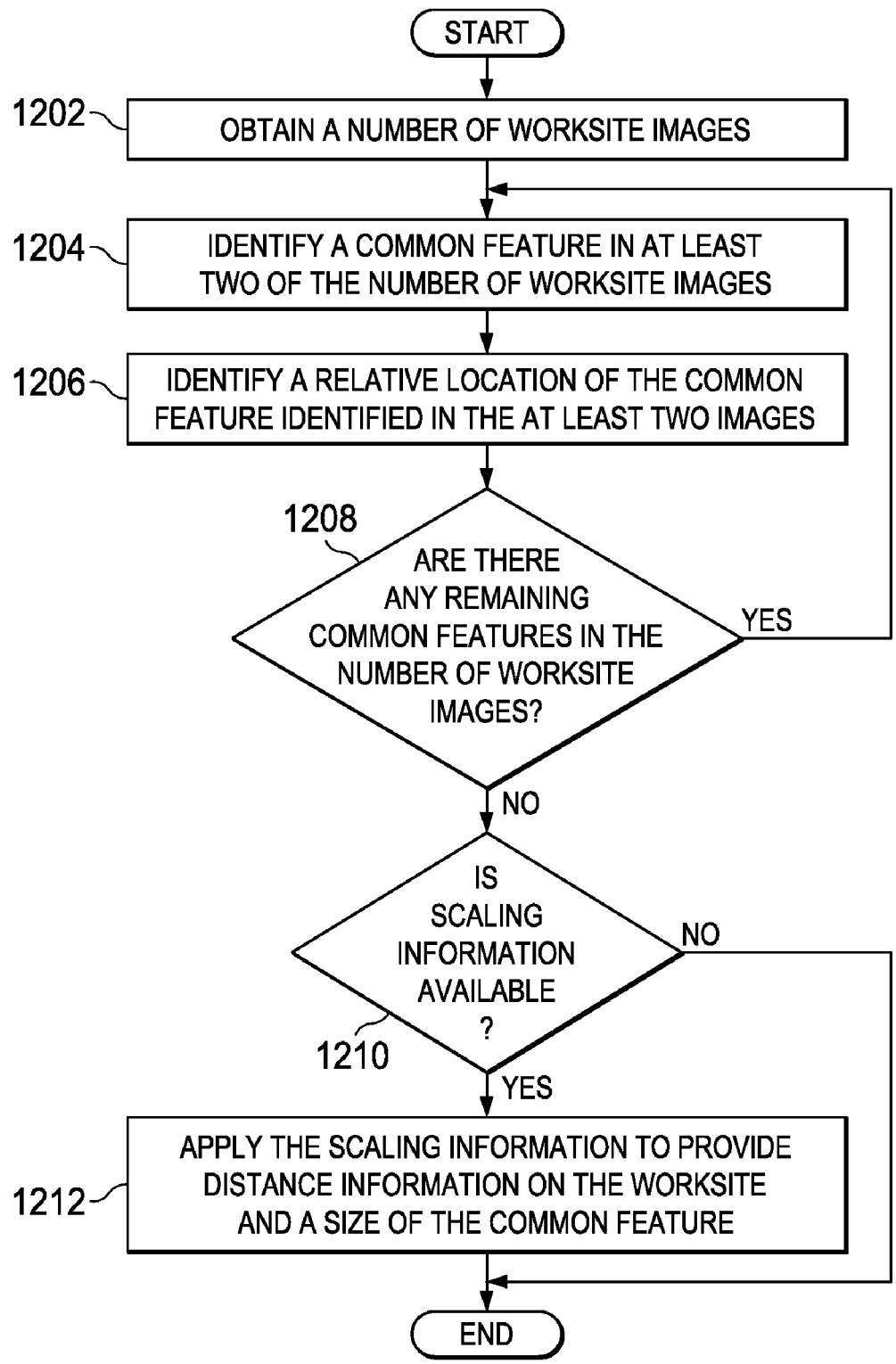
FIG. 12 is a flowchart illustrating a process for identifying worksite features in accordance with an illustrative embodiment.

With reference now to FIG. 12, a flowchart illustrating a process for identifying worksite features is depicted in accordance with an illustrative embodiment. The process in FIG. 12 may be implemented by a component such as worksite feature identification system 103 in FIG. 1, for example.

The process begins by obtaining a number of worksite images (step 1202). The number of worksite images may be obtained using a vision system, such as vision system 328 in FIG. 3, for example. An image sequencer, such as image sequencer 930 in FIG. 9, may compile the number of worksite images into a compiled image, or a three dimensional model of the worksite, for example. The process identifies a common feature in at least two of the number of worksite images (step 1204). The common feature may be an extracted three dimensional object from the three dimensional model of the worksite generated from the number of worksite images, for example.

The process then identifies a relative location of the common feature identified in the at least two images (step 1206). The relative location may be a location relative to the worksite, for example. The relative location may be determined based on analysis of the number of worksite images, such as stereographic analysis, for example. In another illustrative example, the relative location of the common feature may be based on the compilation of the number of worksite images, and the location of the common feature in the three dimensional model generated from the number of worksite images.

The process then determines whether there are any remaining common features in the number of worksite images (step 1208). If a determination is made that there are remaining common features in the number of worksite images, the process returns to step 1204. If a determination is made that there are no remaining common features in the number of worksite images, the process then determines whether scaling information is available (step 1210).

If a determination is made that scaling information is not available, the process terminates. If a determination is made that scaling information is available, the process applies the scaling information to a worksite map to provide distance information for the worksite and a size of the common feature identified (step 1212), with the process terminating thereafter.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as they are suited to the particular use contemplated.

What is claimed is:

1. A method for identifying landmarks in an image, the method comprising:
   receiving an image of a worksite;
   analyzing the image to determine a suggested identity of a worksite feature in the image;
   sending the suggested identity of the worksite feature over a communications unit;
   receiving a confirmation of the suggested identity of the worksite feature to form a confirmed identity; and
   storing the confirmed identity and a location associated with the worksite feature in a database, wherein analyzing the image to determine the suggested identity of the worksite feature in the image comprises obtaining a number of worksite images, identifying a common feature in at least two of the number of worksite images, and identifying a relative location of the common feature identified in the at least two of the number of worksite images.

2. The method of claim 1, wherein the image is received from an environmental data collection system which is moved to a plurality of environment data collection locations by at least one of an autonomous vehicle, a human, an animal, or a human controlled vehicle.

3. The method of claim 1, wherein the confirmation of the suggested identity of the worksite feature is received from a user via a user interface.

4. The method of claim 1, wherein the database comprises a number of candidate objects and object attributes associated with each candidate object of the number of candidate objects, and further comprising:

responsive to receiving the image of the worksite, accessing the database to select the suggested identity of the worksite feature from the number of candidate objects using the object attributes.

5. The method of claim 4, wherein the step of analyzing the image comprises:

selecting a given candidate object from the number of candidate objects that has a highest number of shared attributes with the image to determine the suggested identity of the worksite feature.

6. The method of claim 5, wherein the database further comprises a scaled worksite map comprising additional information pertaining to the worksite feature that is provided by a user using the user interface.

7. The method of claim 1, further comprising:

associating the confirmed identity and a number of attributes for the worksite feature with the location on a worksite map.

8. The method of claim 1, further comprising:

determining whether scaling information is available for the common feature identified; and responsive to a determination that scaling information is available, applying the scaling information to provide distance information on the worksite and a size of the common feature.

9. A system for identifying landmarks in an image, the system comprising:

a worksite features database;

a user interface configured to interact with a user; and a data processing system configured to execute a data classification process to analyze an image to determine a suggested identity of a worksite feature in the image using the worksite features database, send the suggested identity of the worksite feature over a communications unit, receive a confirmation of the suggested identity of the worksite feature to form a confirmed identity, and store the confirmed identity and a number of attributes associated with the confirmed identity in the worksite features database, wherein the data classification process to analyze the image to determine the suggested identity of the worksite feature in the image comprises obtain a number of worksite images, identify a common feature in at least two of the number of worksite images, and identify a relative location of the common feature identified in the at least two of the number of worksite images.

10. The system of claim 9, wherein the image is received from an environmental data collection system which is moved to a plurality of environment data collection locations by at least one of an autonomous vehicle, a human, an animal, or a human controlled vehicle.

11. The system of claim 9, wherein the confirmation of the suggested identity of the worksite feature is received from a user via the user interface.

12. The system of claim 9, wherein the worksite features database comprises a number of candidate objects and object attributes associated with each candidate object of the number of candidate objects that is accessed to determine the suggested identity of the worksite feature from the number of candidate objects using the object attributes.

13. The system of claim 12, where the data processing system is further configured to execute the data classification process to select a given candidate object from the number of candidate objects that has a highest number of shared attributes with the image to determine the suggested identity of the worksite feature.

14. The system of claim 9, wherein the data processing system is further configured to execute the data classification process to associate the confirmed identity and the number of attributes for the worksite feature with a location on a worksite map.

15. A method for identifying worksite features by a system comprising a data processor and memory, the method comprising:

the system obtaining a number of worksite images;

the system identifying a common feature in at least two of the number of worksite images;

the system identifying a relative location of the common feature identified;

the system applying scaling information to a worksite map to provide distance information for the worksite and a size of the common feature identified, wherein the number of worksite images are compiled by an image sequencer to generate a three dimensional model of the worksite, and wherein the image sequencer extracts a three dimensional object from the three dimensional model as the common feature to identify a relative location of the common feature.

16. The method of claim 15, further comprising:

determining whether there are any remaining common features in the number of worksite images; and responsive to a determination that there are remaining common features, identifying a next common feature in at least two of the number of worksite images.

17. The method of claim 15, wherein the number of worksite images is obtained from a vision system of an autonomous vehicle.

18. The method of claim 15, wherein the number of worksite images is obtained from a human operator over a user interface.

* * * * *